United States Patent [19]

Ford

[11] E Re. 30,418

[45] Reissued Oct. 21, 1980

[54] OPTO-ELECTRONIC IGNITION SYSTEMS FOR INTERNAL COMBUSTION ENGINES

[75] Inventor: Eric H. Ford, London, England

[73] Assignee: Lumenition Limited, London, England

[21] Appl. No.: 16,369

[22] Filed: Mar. 1, 1979

Related U.S. Patent Documents

Reissue of:

[64] Patent No.: 4,122,814
Issued: Oct. 31, 1978
Appl. No.: 820,744
Filed: Aug. 1, 1977

U.S. Applications:

[63] Continuation-in-part of Ser. No. 655,138, Feb. 3, 1976, abandoned.

[30] Foreign Application Priority Data

Feb. 12, 1975 [GB] United Kingdom ..... 6028/75

[51] Int. Cl.[2] ..... F02P 1/00

[52] U.S. Cl. ..... 123/651; 315/209 T

[58] Field of Search ..... 123/148 E, 148 CB; 315/209 T

[56] References Cited

U.S. PATENT DOCUMENTS

| | | | |
|---|---|---|---|
| 3,710,131 | 1/1973 | Ford | 123/148 E |
| 3,868,938 | 3/1975 | Trass | 123/148 E |
| 3,931,804 | 1/1976 | Bowen | 123/148 E |
| 3,937,193 | 2/1976 | Kim | 123/148 E |

*Primary Examiner*—Ronald B. Cox
*Attorney, Agent, or Firm*—Larson, Taylor and Hinds

[57] ABSTRACT

An opto-electronic ignition system for an internal combustion engine in which radiation falls on to and is cut off from a photo-transistor in timed sequence with the engine, and in which between the photo-transistor and the primary winding of the ignition coil there is a plurality of switching Darlington pairs, each Darlington switching in inverse relation to its neighbor, and the first Darlington switching in inverse relation with the photo-transistor. The circuit is designed so that it will reliably operate in engine compartment temperatures above 125° C.

11 Claims, 1 Drawing Figure

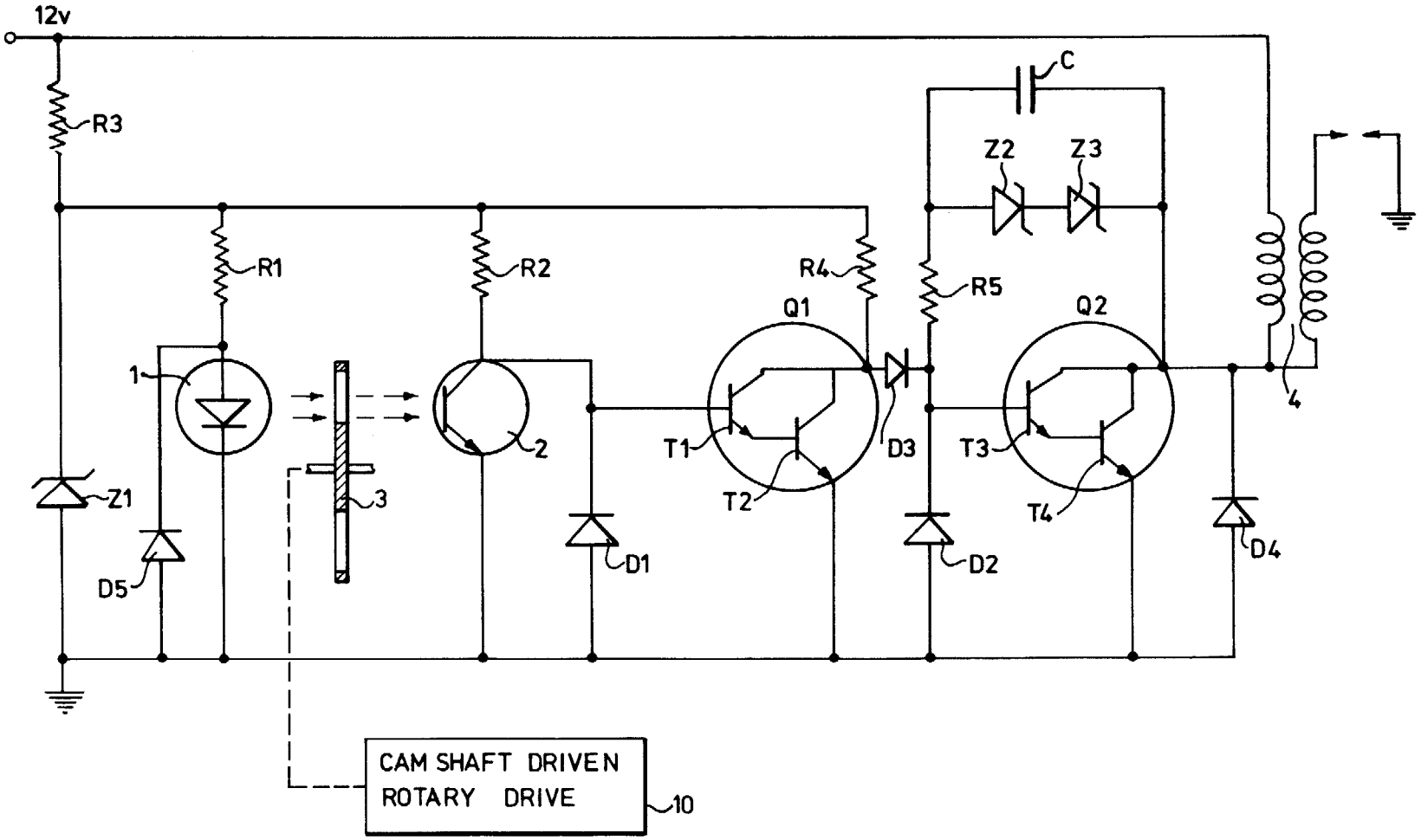
12v
R3
R1
1
D5
Z1
R2
2
3
R4
Q1
T1
T2
D1
D3
R5
Z2
Z3
C
Q2
T3
T4
D2
D4
4
CAM SHAFT DRIVEN
ROTARY DRIVE
10

OPTO-ELECTRONIC IGNITION SYSTEMS FOR INTERNAL COMBUSTION ENGINES

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of Ser. No. 655,138, now abandoned, filed Feb. 3, 1976.

*Applicant hereby claims the priority date of British Patent Appln. No. 6028/75 filed Feb. 12, 1975.*

FIELD OF THE INVENTION

The present invention relates to opto-electronic ignition systems such as disclosed in my U.S. Pat. Nos. 3,605,712 and 3,710,131.

DESCRIPTION OF THE PRIOR ART

In these prior patents the transistors which form the bistable trigger are arranged to switch in inverse relation to one another, so that if any one transistor is fully saturated its neighbors are non-conductive. The purpose of this type of bistable trigger is to ensure that at any instant of time there is always one transistor fully conductive to act as a short-circuit path for any transients on the line.

In my U.S. Pat. No. 3,710,131, three inverse switching transistors are employed between the output of the photo-transistor 2 and the power transistor P. It has also been proposed to use a power Darlington pair in place of the single power transistor. Furthermore, it is known from my U.S. Pat. No. 3,682,150 to replace the photo-transistor by a Darlington pair, one of said components being a photo-transistor. The use of Darlington pairs in ignition circuits is also known from British Pat. No. 1,314,052 (Bowen) in which a Darlington pair (TR1 and TR2) and a power Darlington pair (TR3 and TR4) switch "on" and "off" together.

The circuit arrangement proposed in British Pat. No. 1,314,052 is extremely disadvantageous firstly because of the slow switching due to the fact that the power Darlington pair can only be switched "on" or "off" through the first Darlington pair, and secondly because there is no transient protection for the Darlington pairs which means that the power Darlington pair in particular is extremely vulnerable to transients.

Three stages of inverse switching between the photo-transistor and the power transistor are used in the system disclosed in my U.S. Pat. No. 3,710,131 in order to amplify the low current of about 1 mA through the photo-transistor up to a current of about 10 Amps adequate for the desired operation of the primary winding of the ignition coil.

A further problem arises in connection with the photo-transistor at high ambient temperatures. Under extreme conditions, the temperature within the engine compartment may reach 150° C. It has been found that at temperatures of above about 125° C., the leakage current through the photo-transistor, when in the "off" state, rises very sharply indeed.

Experiments have shown that in fact two different conditions arise which can result in the failure of previous inverse switching circuits to operate at extremely high temperatures, e.g., above 125° C. NPN transistors typically exhibit the following characteristics:

(a) $V_{CE}$sat increases with temperature.

(b) $V_{BE}$ decreases with temperature.

Thus, inverse switching circuits using ordinary NPN transistors are vulnerable to two modes of failure:

(a) The value of $V_{CE}$sat of the photo-transistor rises with increasing temperature until the first transistor of the chain of inverse switching transistors turns "on" instead of being held "off," i.e., when $V_{CE}$sat of photo-transistor exceeds $V_{BE}$ of the first transistor.

(b) The leakage current through the photo-transistor rises exponentially with temperature. This requires the use of a high gain device for the first stage of inverse switching, i.e., a device which will remain "on" at high temperature in spite of losing its base drive which is diverted through the photo-transistor.

In connection with the circuit disclosed in my U.S. Pat. No. 3,682,150, it should be mentioned that I have found the use of a photo-Darlington pair actually amplifies the leakage problem and also has the undesirable effect of substantially reducing the speed of switching.

Also, in the Bowen circuit due to the fact that all semiconductor devices when "off" have leakage currents which increase exponentially with temperature, the presence of any substantial leakage current through the first Darlington pair will be fed direct to the output stage consisting of the second Darlington pair. Due to the high gain of Darlington devices, it would not need much leakage current through the first transistor of the first Darlington pair to turn on the output power Darlington stage and there is accordingly a real danger that this could happen at temperatures above 125° C.

SUMMARY OF THE INVENTION

A principal object of the invention is to provide an opto-electronic ignition system which, although capable of providing rapid switching of the ignition coil, includes a minimum number of switching stages.

Another important object of the invention is to provide such an opto-electronic ignition system which is capable of reliable operation when subjected to elevated engine compartment temperatures.

According to the present invention, there is provided an opto-electronic ignition system for controlling switching of the primary winding of an ignition coil of an internal combustion engine and capable of reliable operation at temperatures above about 125° C., said system comprising a source of radiation; a photo-transistor sensitive to radiation which will switch on or conduct when exposed to the radiation and switch off when the radiation is cut off; means disposed between said source and said photo-transistor for intermittently blocking radiation from said source in timed relation to the engine revolutions so as to control the periods during which radiation is received by said photo-transistor; and a switching circuit for controlling switching of the ignition coil responsive to the output of said photo-transistor, said switching circuit comprising a plurality of pairs of transistors the components of each pair being connected in a Darlington configuration and means for connecting said pairs of transistors to each other between said photo-transistor and the ignition coil such that each Darlington pair switches in inverse relationship to at least one other Darlington pair and a first Darlington pair switches in inverse relationship to said photo-transistor, so as to cause fast switching of the primary winding of the ignition coil thereby inducing a spark voltage in the second winding of the coil.

It has been found that the use of a Darlington pair as the first stage in a chain of inverse switching transistors is capable of eliminating the photo-transistor leakage problem referred to above without affecting the operation of the circuit or the speed of switching.

A parallel circuit consisting of a capacitor and at least one zener diode, and a resistor connected in series therewith, may be connected between the commoned collector electrodes of the first transistor of the final Darlington stage, to thereby protect this stage against positive going transients, and control the rate at which the final stage switches off, thereby eliminating the generation of radio interference.

A zener diode may be provided to supply a stabilized voltage to the source of radiation, the photo-transistor and the first Darlington stage.

A first diode may be connected across the emitter-collector path of the photo-transistor, and a second diode may be connected across the source of radiation, these diodes serving to protect these components against reverse battery connection.

A diode may be connected between each junction of the Darlington pairs of the circuit, and the commoned emitter electrodes of all the second transistors of the Darlington pairs, to protect the circuit against negative going transients and reverse battery connection.

The Darlington pairs, with the possible exception of the last in the circuit, which may be a power Darlington pair, may be formed on a monolithic chip, together with the photo-transistor.

BRIEF DESCRIPTION OF THE DRAWING

The present invention will now be described in greater detail, by way of example, with reference to the accompanying drawing, wherein the sole FIGURE is a circuit diagram of one preferred form of an opto-electronic ignition system.

DESCRIPTION OF THE PREFERRED EMBODIMENT

Referring to the drawing, the circuit includes a solid state gallium arsenide infra-red lamp 1, a photo-transistor 2 and two pairs of Darlington pairs Q1 and Q2. The lamp 1, the photo-transistor 2 and the first Darlington pair Q1 are each in series with respective resistors R1 and R2, and R4, and receive a 7.5 volt stabilized supply from a zener diode Z1. The zener diode Z1 is connected across the 12 volt battery of the vehicle through a resistor R3 and thus supplies all three components mentioned above with a stabilized voltage supply. The advantage of additionally stabilizing the voltage across the first Darlington pair Q1 will be explained later on. A diode D5 is connected across the lamp 1 to protect it against reverse battery connection.

Connected across the emitter-collector electrodes of the photo-transistor 2 is a diode D1, which serves not only to ensure clean switching of the photo-transistor 2, but ensures that any negative transients on the line during the time that the photo-transistor is non-conductive are conducted past the photo-transistor and are thus unable to cause any damage to its structure.

The Darlington pairs Q1 and Q2 each consist of a pair of transistors T1, T2 and T3, T4 respectively, arranged in conventional Darlington configuration. The base electrode of the transistor T1 is connected to the collector electrode of the photo-transistor 2. The commoned collector electrodes of the transistor T1 and T2 are connected firstly to the base electrode of the transistor T3 of the second Darlington pair Q2 through a diode D3, and, secondly, to the 7.5 volt zenered supply through a resistor R4.

A diode D2 is connected across the commoned collector electrodes of the transistors T1 and T2, and the emitter electrode of the transistor T2. The diode D2 serves to protect the Darlington pairs against negative going transients, and also against a careless mechanic connecting the battery the wrong way around. The diode D1 also serves to protect the photo-transistor 2 against reverse battery connection.

The commoned collector electrodes of the transistors T3 and T4 are connected to one end of the primary winding of the ignition coil 4, the other end of which is connected to the positive terminal of the 12 volt battery. Between the commoned collector electrodes of the transistors T3 and T4, and the base electrode of the transistor T3, there is connected a circuit comprising a pair of zener diodes Z2 and Z3 and a resistor R5 all connected in series and a capacitor C connected in parallel with the zener diodes Z2 and Z3. The purpose of the circuit is firstly to control the rate of switching of the Darlington pair Q2, and secondly, to protect the Darlington pair against positive going transients. Without this circuit, the voltage induced in the primary winding of the ignition coil consists of a first positive going spike which will rise very sharply and in extreme cases will reach a peak of 400 volts followed by a series of smaller spikes. The presence of the zener diodes Z2 and Z3 ensures that the Darlington pair Q2 will be turned on again when this positive going spike exceeds the combined zener voltage of the two zener diodes. The capacitor C has the effect of increasing the duration of the rise time of the first positive going spike, thus ensuring that any radiation which would have been generated by an uncontrolled positive going spike is eliminated thus preventing radio interference.

A diode D4 is connected between the commoned collector electrodes of the transistors T3 and T4 and the emitter electrode of the transistor T4 of the Darlington pair Q2 and protects the device against reverse battery connection.

It is stated above that the zener diode Z1 provides a stabilized 7.5 volt supply to the Darlington pair Q1 in addition to the infra-red lamp 1 and the photo-transistor 2. Furthermore, it is essential that the diode D3 has a minimum storage time in the base of Darlington pair Q2, and both a minimum forward-recovery time and a minimum reverse recovery time. This is achieved by the zenered supply to the resistor R4 in the collector circuit of the Darlington pair Q1. Operated under these conditions the diode D3 together with the circuit consisting of zener diodes Z2 and Z3, the capacitor C and the resistor R5, helps to ensure that there is no radio interference generated on switching the Darlington pairs.

With regard to the operation of the circuit at temperatures above 125° C., it has been found that the use of the Darlington pair Q1 as the first stage of inverse switching instead of a single transistor, reduces the risk of failure. This is firstly because the value of $V_{BE}$ of the first stage is double that of a single transistor. Moreover, since the Darlington pair Q1 will have a high gain, its operation in the inverse switching chain of Darlington pairs is unaffected when it loses its base drive through leakage across the photo-transistor. Accordingly, the circuit is able to operate satisfactorily when subjected to engine compartment temperatures above 125° C.

In one preferred form, the Darlington pair Q2 is a power Darlington pair, thus ensuring sufficient current carrying capacity to handle the currents flowing through the primary winding of the coil when the magnetic field of the coil is being built up.

In the above-described embodiment the photo-transistor 2, and the Darlington pairs Q1 and Q2 all switch in inverse relation to one another. Thus, when the photo-transistor 2 receives the infra-red radiation from the solid-state lamp 1 it will switch on in the fully saturated condition, which means that the Darlington pair Q1 is non-conductive, whilst the Darlington pair Q2 is fully on, passing the ignition coil current through the primary winding of the coil 4. As soon as the infra-red radiation is cut off from the photo-transistor 2, it is rendered non-conductive, which switches the Darlington pair Q1 on, and the Darlington pair Q2, off. When the Darlington pair Q2 switches off the primary current is interrupted to cause the collapse of the magnetic field associated with the coil 4, and the induction of a high voltage in the secondary winding to produce the spark.

It will be appreciated that there it is desired to switch in the reverse mode, i.e., the spark is produced when the photo-transistor 2 is rendered conductive, all that is necessary is to introduce a further Darlington pair in the chain of Darlington pairs.

The switching on and off of the photo-transistor is achieved by means of a bladed disc 3, such as disclosed in my U.S. Pat. No. 3,710,131, or an apertured disc such as the type disclosed for the first trigger in my U.S. Pat. No. 3,981,282. Preferably, where the disc is driven from the cam shaft of the engine the number of apertures or slots is equal to the number of cylinders in the engine, but if the disc is not mounted within the distributor housing, as is conventional, the number of slots or apertures may be a multiple or sub-multiple of the number of cylinders in the engine. A drive for the disc 3 is indicated at 10.

As disclosed in my copending U.S. application Ser. No. 759,061, filed Jan. 13, 1977 as a continuation-in-part application on my U.S. application Ser. No. 652,748 now abandoned, the Darlington pair Q1, or in the case of the reverse mode switching trigger, the first two Darlington pairs in the circuit may be formed on a monolithic chip, together with the photo-transistor 2, the diode D1 and the resistors R2 and R4, appropriate interconnections being made by well known integrated circuit techniques. In this construction the monolithic chip is mounted within the distributor housing opposite the gallium arsenide lamp, between which the blades of the chopper disc rotate. The power Darlington pair is mounted on a separate heat sink outside the distributor housing, together with the resistors R3 and R5, the zener diodes Z1 and Z3, and the diodes D2 and D3.

A further advantage arising out of the use of a Darlington pair as the first stage of inverse switching is that because of the high gain of the device it is possible to use a smaller photo-area for the base of the photo-transistor than that proposed in my copending application Ser. No. 759,061 referred to above. It is thus possible to match the characteristics of the photo-transistor 2 to those of the infra-red gallium arsenide lamp 1 in order to keep the switching point accurate throughout the range. Although a reduction in size of the photo-area will mean a reduction in photo-current passed by the photo-transistor, this is more than made up by the gain of the first Darlington pair Q1.

Alternatively, in cases where heat dissipation is not a serious problem, the power Darlington pair may also be formed on the monolithic chip.

Although in the above embodiment there are two series connected zener diodes across the Darlington pair Q2, it is possible to provide only a single zener diode if the voltage rating is high enough to effect satisfactory operation of the Darlington pair in the presence of transients.

It will be appreciated that the chain of Darlington pairs can have two, four or six pairs for one mode of switching, or three, five or seven pairs for the reverse mode of switching.

It will be further appreciated that a diode is inserted between each Darlington pair and ground.

What I claim and desire to secure by Letters Patent is:

1. An opto-electronic ignition system for controlling switching of the primary winding of an ignition coil of an internal combustion engine and capable of reliable operation at temperatures above about 125° C., said system comprising a source of radiation; a photo-transistor sensitive to radiation which will switch on or conduct when exposed to the radiation and switch off when the radiation is cut off; means disposed between said source and said photo-transistor for intermittently blocking radiation from said source in timed relation to the engine revolutions so as to control the periods during which radiation is received by said photo-transistor; and a switching circuit for controlling switching of the ignition coil responsive to the output of said photo-transistor; said switching circuit comprising a plurality of pairs of transistors the components of each pair being connected in a Darlington configuration and means for connecting said pairs of transistors to each other between said photo-transistor and the ignition coil such that each Darlington pair switches in inverse relationship to at least one other Darlington pair and a first Darlington pair switches in inverse relationship to said photo-transistor, so as to cause fast switching of the primary winding of the ignition coil thereby inducing a spark voltage in the second winding of the coil.

2. An opto-electronic ignition system according to claim 1, wherein the radiation source is a gallium arsenide lamp emitting radiation in the infra-red region of the electro-magnetic spectrum.

3. An opto-electronic ignition system according to claim 1, wherein the last Darlington pair in the circuit is a Darlington power pair, the emitter-collector path of the second transistor being connected in series with the primary winding of the ignition coil.

4. An opto-electronic ignition system according to claim 3, wherein means are provided for protecting the Darlington power transistor against transients and for slowing down the fast switch off of said power Darlington pair.

5. An opto-electronic ignition system according to claim 4, wherein said means includes a parallel circuit consisting of a capacitor and at least one zener diode, and a resistor connected in series therewith, said parallel circuit being connected between the commoned collector electrodes and the base electrode of the first transistor of the Darlington power pair.

6. An opto-electronic ignition system according to claim 4, wherein a diode is connected between the emitter electrode of the second transistor and the base electrode of the first transistor of the Darlington power pair, to thereby protect the Darlington power pair against negative going transients.

7. An opto-electronic ignition system according to claim 2, wherein a zener diode is connected across both the gallium arsenide lamp, the photo-transistor and the first Darlington pair to provide a stabilized voltage source therefor.

8. An opto-electronic ignition system according to claim 2, wherein a first diode is connected across the emitter-collector path of the photo-transistor, and a second diode is connected across the gallium arsenide lamp.

9. An opto-electronic ignition system according to claim 1, wherein there is an even number of Darlington pairs in the transistorized ignition circuit, the spark for ignition being produced on de-energization of the photo-transistor.

10. An opto-electronic ignition system according to claim 1, wherein there is an odd number of Darlington pairs in the transistorized ignition circuit, the spark for ignition being produced on energization of the photo-transistor.

11. An opto-electronic ignition system for controlling switching of the primary winding of an ignition coil of an internal combustion engine and capable of reliable operation at temperatures above about 125° C., said system comprising an infra-red solid state source of radiation; a photo-transistor sensitive to infra-red radiation which will switch on or conduct when exposed to the radiation and switch off when the radiation is cut off; means arranged between said infra-red radiation source and said photo-transistor for intermittently blocking radiation from said infra-red source in timed relation to the engine revolutions so as to control the periods during which the infra-red radiation is received by said photo-transistor; and a switching circuit for controlling switching of the ignition coil responsive to the output of said photo-transistor, said switching circuit comprising first and second pairs of transistors connected in a Darlington configuration and means for connecting said pairs of transistors to each other between said photo-transistor and the ignition coil such that the two Darlington pairs switch in inverse relationship to each other and the said first Darlington pair switches in inverse relationship to said photo-transistor so as to cause fast switching of the primary winding of the ignition coil thereby inducing a spark voltage in the second winding of the coil.

* * * * *